United States Patent [19]

Swearingen

[11] 3,983,958

[45] Oct. 5, 1976

[54] METHOD AND APPARATUS FOR OBSERVING, INDICATING AND MAINTAINING FLUID LEVEL

[76] Inventor: Michael R. Swearingen, 6535 Jefferson, Groves, Tex. 77619

[22] Filed: Oct. 9, 1975

[21] Appl. No.: 621,236

[52] U.S. Cl. .............................. 184/28; 134/113; 134/169 C; 137/453; 184/1 C; 184/1 E; 184/66; 184/96; 184/103 R; 417/63
[51] Int. Cl.² ................. F16N 13/08; F16N 29/02; F01M 11/06
[58] Field of Search ............ 184/103 R, 103 A, 65, 184/66, 74, 76, 80, 1 C, 1 E, 1.5, 6, 6.4, 6.28, 28, 96, 97, 38 R, 38 A, 38 B, 38 C; 116/118 R, 118 A; 137/453; 73/32.3; 134/169 R, 169 A, 169 C, 113, 196, 197; 417/63, 437

[56] References Cited
UNITED STATES PATENTS

| | | | |
|---|---|---|---|
| 635,210 | 10/1899 | Van Vriesland | 184/103 R X |
| 943,959 | 12/1909 | Van Zoelen | 184/103 R |
| 1,435,276 | 11/1922 | Bignell | 184/38 R |
| 1,548,222 | 8/1925 | Spreen | 184/103 R |
| 1,923,857 | 8/1933 | Armantrout et al. | 184/103 R |
| 1,972,962 | 9/1934 | Weber | 184/103 R X |
| 2,071,929 | 2/1937 | Harter | 184/103 R |
| 2,460,814 | 2/1949 | Duerr, Jr. | 184/103 R X |
| 2,564,230 | 8/1951 | Pitney | 184/103 R X |

FOREIGN PATENTS OR APPLICATIONS

| | | | |
|---|---|---|---|
| 397,857 | 8/1933 | United Kingdom | 137/453 |

Primary Examiner—Richard C. Pinkham
Assistant Examiner—Arnold W. Kramer
Attorney, Agent, or Firm—Arnold, White & Durkee

[57] ABSTRACT

Apparatus is provided for attachment to a bearing housing through an access conduit, which provides means for allowing observation of the lubricating oil in the bearing housing, ascertaining the level of oil in the lubricating housing, and maintaining a desired fluid level in the bearing. The apparatus provided has an upper chamber and lower chamber, separated by a partition. An opening in the partition allows fluid communication between the upper and lower chambers with a tube connected to the opening and extending a distance into the lower chamber. An aperture through the housing in the lower chamber above the lower end of the tube allows ambient pressure in the lower chamber. Lubricating oil in the two chambers may be pushed from the chambers through the access conduit by a plunger in the upper chamber when the aperture is covered by the hand to remove any blockage of the conduit and then upon withdrawal of the plunger bringing fluid back into the lower and upper chamber. Oil may be observed for condition in the chambers, and the oil level in the bearing determined. When the aperture is uncovered the oil is maintained at the desired level.

10 Claims, 3 Drawing Figures

METHOD AND APPARATUS FOR OBSERVING, INDICATING AND MAINTAINING FLUID LEVEL

BACKGROUND OF THE INVENTION

This invention relates to maintaining a constant desired level of lubricating oil in a bearing housing, with means for replenishing the lubricating oil should it drop below a predetermined minimum level. The invention further relates to such apparatus which will allow the operator to observe the oil from the bearing, ascertain the level of oil in the bearing, and insure that the access line between the bearing and the apparatus is not obstructed.

As is well known in the art, it is important that sufficient lubricating oil be maintained in bearing housings to lubricate the bearings. It is further important in many installations that the lubricating oil so maintained in the bearings be of a high quality.

It is of further importance in many contexts of use, to provide apparatus so that the level of lubricating oil in a bearing housing is maintained at a relatively constant minimum level without continuous supervision from the operator.

In practice, many operators in attempting to maintain the level of lubricating oil in a bearing housing above a minimum desired level, have overcompensated by overfilling the bearing housing with lubricating oil. But too much oil in a bearing housing may cause the bearing to run hot and to burn out. Thus, it is further desirable to provide an apparatus which would, in this context of use, provide for maximum level control.

Since bearing housings are typically enclosed systems and often in environments where it is difficult, hazardous, or even impossible for the operator to actually observe what is happening in the bearing, various difficulties are encountered in obtaining the objectives indicated above.

The art has recognized the importance of these objectives, but has thus far not been able to deal with them in the most efficient manner, i.e., by providing a single apparatus which will make possible attainment of all these objectives. Rather, the best the art has been able to do is a limited combination of two or more of these objectives.

For example, in Gits U.S. Pat. No. 2,041,920, apparatus is provided for maintaining the level of lubricating oil in a bearing at a constant level. Further, by provision of a transparent reservoir, the apparatus of the Gits patent allows the operator to observe the level of oil in such reservoir. In La Porte U.S. Pat. No. 2,840,035, an oil condition and level indicating device is disclosed for use in connection with an automobile dashboard. Use of the La Porte device would allow the automobile driver to ascertain that oil is either above or below a predetermined minimum level, and would further allow the operator to examine a sample of the lubricating oil. The La Porte device would not allow an operator to determine how far below a minimum predetermined level, if it is below such level, the lubricating oil might be, and further it would not provide any means for replenishing lubricating oil. In U.S. Pat. No. 3,834,236, Durin provides a device for measuring the exact level of oil in the crankcase of an engine. The Durin device allows the operator to ascertain the level of the lubricating oil so long as the level is above a minimum predetermined level. Here again, there is no provision for replenishing oil in the crankcase.

The art has made a number of other attempts to provide solutions to one or more of the problems indicated by applicant, but has not effectively been able to solve these problems in a single apparatus. Other U.S. patents which are illustrative of attempts made to solve these problems are Duerr, U.S. Pat. No. 2,460,814; Pitney, U.S. Pat. No. 2,564,230; Kawecki, U.S. Pat. No. 3,103,816; Perkins, U.S. Pat. No. 3,447,548; and Jones, U.S. Pat. No. 3,782,323.

Especially perplexing in practical use is the problem inherent in attachment of prior art devices to a bearing housing by means of an access conduit. In many devices now in common use, the access conduit becomes clogged from time to time. When this occurs, the operator observing the device is unaware of the plugged conduit and does not get a true indication of lubricating condition of the bearing, commonly resulting in bearing failure.

This invention provides in a single apparatus, means for unplugging a clogged access pipe as well as means for accomplishing all of these objectives and advantages, thereby allowing the operator to overcome the deficiencies in the prior art.

SUMMARY OF THE INVENTION

The invention provides an apparatus which may be joined in fluid communication through an access pipe or the like, with a bearing housing. The apparatus provided enables the operator to observe the level of lubricating oil in the bearing, to observe the condition of the lubricating oil, and further provides for maintenance of a constant level of lubricating oil in the bearing, including replenishing such lubricating oil when the level of the oil in the bearing goes below a predetermined minimum level.

The apparatus provided consists of a housing which comprises two chambers, an upper chamber and a lower chamber. In the upper chamber is disposed a plunger with operating rod.

The lower chamber has an aperture in the side wall thereof, and a drip tube which communicates with the upper chamber. The lower chamber also contains means for establishing fluid communication with the bearing housing. At least a portion of each upper and lower chamber is transparent.

In accordance with the operation of the invention, the operating rod is depressed so that oil in the upper chamber is pushed into the lower chamber and thence through the access pipe toward the bearing housing. The operating rod is then pulled up drawing lubricating oil through the access pipe first into the lower chamber, and thence into the upper chamber. The operator may then observe the oil in the upper chamber to ascertain the true condition of the oil. In the lower chamber, the oil level in the bearing is ascertained by observance, after opening the aperture in the side wall of the lower chamber to establish ambient pressure in the lower chamber.

The level of oil in the bearing is maintained above a predetermined minimum level, which is the lower level of the drip tube in the lower chamber, because of the replenishing supply available in the upper chamber. Means are also included to prevent overfilling the bearing housing to thereby maintain the oil level below a predetermined maximum level.

Obstruction of the access pipe, which is the major reason presently available oil level indicators are not reliable, is eliminated by the forcing of the lubricating oil back and forth therethrough upon depression and raising of the operating rod.

DETAILED DESCRIPTION OF PREFERRED EMBODIMENTS

The invention will now be explained in terms of preferred embodiments which represent the best mode of this invention known to the applicant at the time of this application. Such embodiments are illustrated in the drawings which are attached hereto and comprise a part of this application, wherein.

Figure 1:
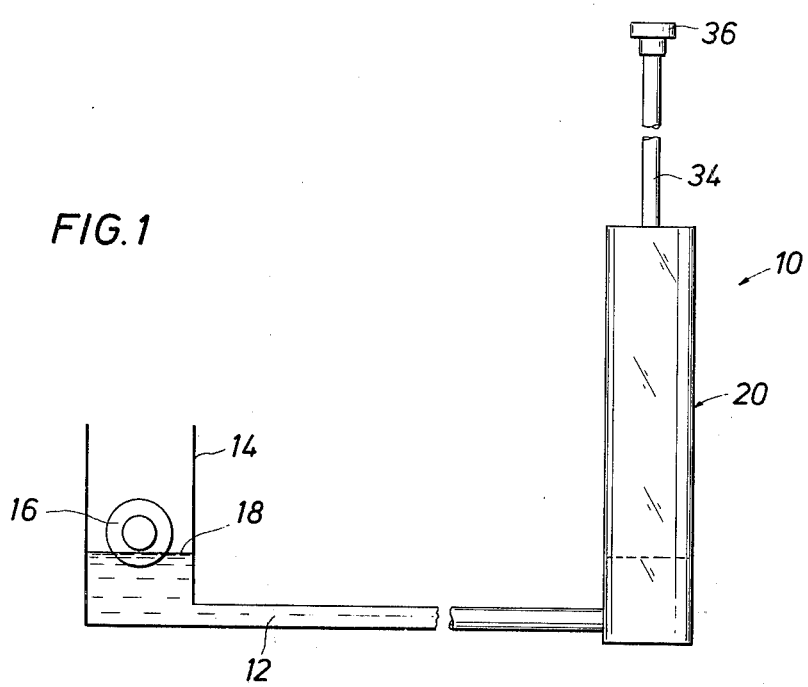
FIG. 1 is a schematic view of apparatus in accordance with the invention in its environment of use.
Figure 2:
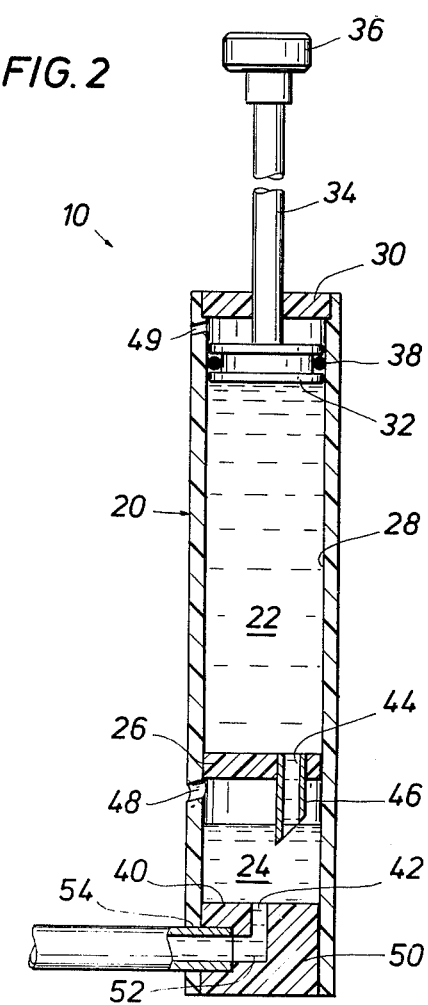
FIG. 2 is an elevational section view of such apparatus, showing the apparatus at one stage of its operation; and, FIG. 3 is a view similar to FIG. 2 showing the apparatus at another stage in its operation.
Figure 3:
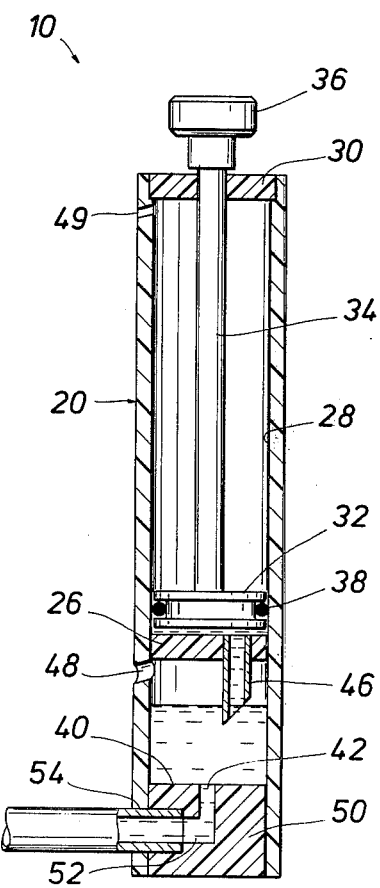

The drawings show an apparatus 10 constructed in accordance with this preferred embodiment of the invention, connected by suitable fluid communication means such as the access pipe 12 to a bearing housing 14 having a bearing 16 therein. In accordance with known procedures in the art, the desired level of lubricating oil in the bearing housing will be determined, and this level may be adjusted by the operator depending upon the particular context of use of the invention. One desired level which will be used for purposes of explanation of this preferred embodiment is a minimum desired fluid level, which in this example is indicated at 18 in FIG. 1.

The apparatus 10 comprises a housing 20 which in the preferred embodiment is formed by a tubular wall 28, a top 30, and a solid bottom portion 50. It will be recognized that other shapes might be suitable, although the tubular shape has been found most convenient by applicant.

The wall 28 forming the housing 20 is at least partially transparent to allow observation of fluid in the housing.

The transparent nature of the housing may be assured by construction of suitable transparent polymeric material such as methyl methacrylate which will likely be preferable to a glass construction in most contexts of use. It is recognized that even though applicant has found the completely transparent form of the housing to be particularly desirable, it would also be feasible to construct the housing of a solid material such as steel, with suitably placed transparent window or windows for observation.

The housing 20 is comprised of two chambers, a first chamber 22 and a second chamber 24, separated by a partition 26.

In the configuration shown in the preferred embodiment, the apparatus 10 is illustrated in an upright position wherein the first chamber 22 is an upper chamber, and the second chamber 24 is a lower chamber. For convenience of explanation, the apparatus will be described in this context.

The first or upper chamber 22 is defined by the inner surface of wall 28 of housing 20, the upper wall of partition 26, and the lower wall of the top portion 30. The second or lower chamber 24 is defined by the inner surface of wall 28, a lower wall 40 which is a part of a solid bottom portion 50, and the lower wall of partition 26.

Although the exact sizes and shapes of the chambers 22 and 24 are not critical, it is important that the chamber 24 be sufficiently large to accommodate a reasonable sample of lubricating oil. This will usually mean that the diameter of the chamber 24 should be at least as great as, and preferably greater than, the diameter of the access pipe 12. It will generally be preferred to construct the chamber 22 of a size somewhat larger than the chamber 24, in that the chamber 22 is used to hold a replenishing oil supply, to maintain the desired oil level in the bearing, and further because sufficient lubricating oil should be present in the chamber 22 to completely flush the access pipe to remove any possible obstructions therefrom.

Such flushing is accomplished by suitable means for forcing the oil from the housing 20 through the access pipe. Such means conveniently take the form of a plunger 32 slideably mounted in the interior of chamber 22, in a manner such that the plunger is sealed around its circumference by means of a suitable seal such as O-ring 38. The plunger 32 is operated by means of an operating rod 34, and for convenience the operating rod 34 has a handle 36 at its end opposite the plunger 32. The length of the operating rod 34 should be somewhat greater than the length of the chamber 22.

The chamber 24 has in the wall 28 thereof, near the partition 26, an aperture 48. This aperture 48 is on the horizontal plane of the maximum desired lubricating oil level in the bearing housing 14.

Another aperture 44 in the partition 26, allows fluid communication between the chamber 22 and the chamber 24. A tube 46 is attached to the aperture 44 and extends a distance into the second chamber 24. The tube 46 is preferably equipped with an inclined lower portion, the upper part of which should be placed at a level which is on a horizontal plane with the minimum desired oil level 18 in the bearing housing.

Aperture 49 in the top of chamber 22 allows for operation of the plunger without creating a vacuum or pressurized condition in the upper chamber.

The lower portion 50 of the apparatus 10 is not critical to the invention, but rather represents one convenient way of establishing fluid communication between the chamber 24 and the access pipe 12. In the embodiment illustrated in the drawings, the portion 50 is a solid portion having an L-shaped bore 52 therein. The bore 52 communicates through an opening 42 in the lower wall 40 to the chamber 24, and at its opposite end 54, which is desirably threaded, to the access pipe 12. It is readily understood that communication with the access pipe 12 could just as easily be through the bottom of the end portion 50, or could be established in any convenient manner. It is desirable to offset the opening 42 from the drip tube 46, so that air bubbles generated by bearing action and entering the opening 42, will not rise through the tube 46 into the chamber 22, thus giving a false illusion of leakage or oil usage. This is an additional difficulty with some currently marketed devices.

Although as stated above dimensions are not critical, applicant has found it convenient to employ as one preferred embodiment, a housing having a diameter of about ¾th inch in connection with ⅜th inch access pipe. In this instance, the length of the chamber 22 would desirably be about 4 inches, and the length of the chamber 24 would be 1 inch. The aperture 48 is adjacent the partition 26, and the tube 46 extends into chamber 24 approximately one-half inch.

In operation, the chamber 22 will initially contain a significant supply of lubricating oil, and preferably will be substantially full. The lubricating oil in chamber 22 is observed by the operator, who views the oil therein through the transparent housing 20. Then, the aperture 48 is covered and the operating rod 34 is pushed to depress the plunger 32 through the chamber 22. Preferably, the plunger will be depressed all the way through the chamber until the plunger 32 is positioned adjacent the partition 26. This forces the lubricating oil in the chamber 22 through the aperture 44 and into the lower chamber 24. Thence, oil is forced from the chamber 24 through the aperture 42 and through the access pipe 12. In this manner, any obstruction in the access pipe 12 is removed by the force of oil pushing through the pipe.

The operating rod 34 is then raised so that the plunger 32 moves back to its original position adjacent the top 30 of chamber 22. Since the aperture 48 is still covered, the pressure in the chambers 22 and 24 is significantly below atmospheric, and thus the chambers 24 and 22 are substantially filled with lubricating oil after the plunger has reached its uppermost position. At this point, the operator again observes the oil in chamber 22 and ascertains whether there is a significant difference in the condition of the oil which was originally in the chamber 22 and the condition of the oil which is now in the chamber 22. If the oil now in the chamber 22 is much dirtier than the oil originally in the chamber 22, or contains metal particles, sludge, moisture, etc., the operator knows that the lubricating oil control of the bearing 16 has not been acceptable.

it is important that the oil being observed by the operator is truly representative of the oil in the bearing housing. Thus, it is not oil which is isolated from the bearing housing by a plug in the access line. Neither is it oil which has been added directly into the apparatus without passing first through the bearing. For, in contrast to devices which are currently in use, lubricating oil is not added directly into the device of this embodiment, but rather is added, when needed, either by the replenishing supply in the chamber 22 or (if ever necessary) directly into the top of the bearing housing 14.

The aperture 48 is then uncovered, allowing the pressure in chamber 24 to increase to atmospheric. When this happens, the lubricating oil in the chamber 24 will drain through the opening 42 into the access pipe 12, until equilibrium is established and the level of the oil in the chamber 24 reaches the level of oil in the bearing housing 14. The operator can then ascertain the level of oil in the bearing housing 14.

Further, a supply of replenishing lubricating oil will be maintained in the chamber 22 until such time as the oil in the chamber 24 is exhausted below the bottom opening of the tube 46. If the oil level in the bearing housing 14 should drop beneath the desired minimum level 18, and hence below the upper opening of tube 46, an air bubble will enter the tube 46 and then the chamber 22. When this happens, sufficient oil will drain from the chamber 22 through the tube 46 into the chamber 24, to bring the lubricating oil in the chamber 24 and in the bearing housing 14 back up to the desired minimum level 18.

If the lubricating oil in the bearing housing is above the desired maximum level, excess oil will drain to the atmosphere through the aperture 48.

From the above discussion, it will be apparent that apparatus and methods have been provided by this invention which allow the operator to observe the condition of lubricating oil in a bearing housing.

Further, by comparison of the sample of lubricating oil in the chamber 22 before and after depression and raising of the plunger 32, the operator may ascertain whether the bearing housing is receiving adequate lubricating control.

Still further, through use of this invention the operator is able to determine the level of lubricating oil in the bearing housing.

Also, the invention provides a means for facilitating maintenance of lubricating oil in a bearing housing at least above a desired minimum level, and at least below a desired maximum level.

Still further, the invention provides a convenient means for assuring that the primary problem of prior devices is eliminated, i.e., obstruction of the access pipe.

Most importantly, all of these advantages are accomplished in a single apparatus which is conveniently joined in fluid communication with a bearing housing even in difficult environments such as a refinery.

Although the invention has been described in terms of preferred embodiments, it will be apparent to those of skill in the art that various changes may be made in the apparatus and methods disclosed without departing from the scope of the invention, which is defined by the following claims.

What is claimed is:

1. Apparatus connected to a bearing housing by means of an access pipe, for allowing observation of the lubricating oil in the bearing housing, ascertainment of the level of lubricating oil in the bearing housing, and maintenance of at least a desired oil level in the bearing housing, comprising:
   a housing comprising a first chamber and a second chamber;
   a partition between said first chamber and said second chamber, said partition having an opening therein;
   a tube attached to said opening and extending into said second chamber;
   means in said first chamber for displacing the lubricating oil from said chamber and for drawing oil back thereinto;
   an opening to the atmosphere in said second chamber to allow ambient pressure to be established when desired in said chamber; and
   means for fluid communication from a lower part of said second chamber to said access pipe.

2. Apparatus in accordance with claim 1, wherein said means in said first chamber comprises a plunger connected to an operating rod.

3. Apparatus in accordance with claim 1, wherein said apparatus housing is of tubular configuration.

4. Apparatus in accordance with claim 3, wherein said housing is constructed of transparent material.

5. Apparatus in accordance with claim 1, wherein said opening to the atmosphere is closer to said partition than is the end of said tube opposite said partition.

6. Apparatus in accordance with claim 1, wherein the volume of fluid in said access pipe is less than the volume of fluid in said second chamber.

7. Apparatus connected to a bearing housing by means of an access pipe, for allowing observation of the lubricating oil in the bearing housing, ascertainment of the level of lubricating oil in the bearing housing, and maintenance of at least a desired oil level in the bearing housing, comprising:
- a tubular housing having a partition therein, defining an upper chamber and a lower chamber;
- an opening in said partition to allow fluid communication between said upper chamber and said lower chamber;
- a tube connected to said opening, and extending a distance into said lower chamber;
- an aperture through the housing in said lower chamber, to allow ambient pressure to be established when desired in said chamber;
- fluid communication means between said lower chamber and said access pipe;
- a plunger in said upper chamber, for forcing fluid from said chamber through said tube into said lower chamber, and thence through said fluid communication means into said access pipe, to flush said pipe, and then upon withdrawal for bringing fluid from said access pipe into said lower chamber and then into said upper chamber for observation, wherein at least a portion of each said upper chamber and said lower chamber includes view means so that an observer may view the fluid in said chambers.

8. Apparatus in accordance with claim 7, wherein the distance between the lower end of said tube and said partition is greater than the distance between said aperture and said partition.

9. Apparatus in accordance with claim 7, wherein the volume of fluid in said access pipe is less than the volume of fluid in said lower chamber.

10. A method for controlling and observing the lubricating oil in a bearing housing, comprising:
- attaching to said bearing housing through an access pipe, means comprising a housing having a partition therein defining an upper chamber and a lower chamber, said upper chamber having a plunger therein, and said lower chamber having a first opening to the atmosphere and a second opening to said access pipe therein, and said partition having an opening therein so that fluid communication may be established between said upper and lower chambers;
- observing the lubricating oil in said upper chamber to establish its initial condition;
- covering said first opening in said lower chamber;
- depressing said plunger to a point proximate said partition, to force lubricating oil from said first chamber into said second chamber and thence into said access pipe to flush said pipe;
- thence withdrawing said plunger to bring lubricating oil from said bearing housing into said upper chamber, and observing said oil therein to compare the condition of said oil with the initial condition;
- uncovering said first opening to establish atmospheric pressure in said second chamber; and
- observing the fluid level in said second chamber.

* * * * *